United States Patent [19]

Baker

[11] Patent Number: 4,711,529

[45] Date of Patent: Dec. 8, 1987

[54] OPTICAL INTERFACE APPARATUS

[75] Inventor: Anthony P. Baker, New York, N.Y.

[73] Assignee: ITT Defense Communications, a Division of ITT Corporation, Nutley, N.J.

[21] Appl. No.: 795,149

[22] Filed: Nov. 5, 1985

[51] Int. Cl.⁴ .............................................. G02F 1/133
[52] U.S. Cl. ................................ 350/331 R; 350/96.14;
350/334; 455/605; 455/616
[58] Field of Search ............... 350/331 R, 334, 388,
350/350 R, 96.14, 347 V; 430/288, 199;
455/601, 603, 605, 608, 616; 370/24, 27, 32

[56]  References Cited

U.S. PATENT DOCUMENTS

| | | | |
|---|---|---|---|
| 3,821,720 | 6/1974 | Greubel et al. | 350/350 R |
| 3,931,041 | 1/1976 | Saeva et al. | 350/350 R |
| 3,932,025 | 1/1976 | Lakatos et al. | 350/388 |
| 4,278,327 | 7/1981 | McMahon et al. | 350/334 |
| 4,436,376 | 3/1984 | Fergason | 455/616 |
| 4,484,322 | 1/1984 | Fossati et al. | 370/24 |

Primary Examiner—John K. Corbin
Assistant Examiner—Martin Lerner
Attorney, Agent, or Firm—Robert A. Walsh; Mary C. Werner

[57]  ABSTRACT

An optical interface apparatus includes a liquid crystal carrier light beam modulator and a liquid crystal demodulator.

11 Claims, 1 Drawing Figure

OPTICAL INTERFACE APPARATUS

CROSS-REFERENCE TO RELATED APPLICATIONS

This application is related to one, or more, of the following U.S. patent applications: Ser. No. 795,156; Ser. No. 795,151; Ser. No. 795,150; Ser. No. 795,154; Ser. No. 795,155; Ser. No. 795,138; Ser. No. 795,148; Ser. No. 795,157; Ser. No. 795,152; Ser. No. 795,296 all filed on even date herewith. All of the above applications are assigned to the assignee hereof.

BACKGROUND OF THE INVENTION

The present invention generally relates to an optical interface apparatus and, in particular, relates to such an apparatus wherein a light signal is modulated and/or demodulated by means including a liquid crystal material.

The use of optical fibers in a communication system is advantageous since a substantial amount of information can be conveyed over a relatively physically small optical fiber. In addition, the information is conveyed by optical fibers that exhibit negligible electromagnetic interference or radio frequency interference to the surrounding environment. Further, optical fibers are quite insensitive to such interference emitted from surrounding devices and systems.

Although these advantages have been contemplated and generally known for some time the practical application of optical fiber technology has advanced at a relatively slow pace. One particular impediment is that previously proposed liquid crystal optical switching devices are expensive and difficult to manufacture. For example, light beams associated therewith are required to be very precisely aligned and stabilized to impinge upon a liquid crystal material at the critical angle thereof. Such liquid crystal devices are both expensive to manufacture and are not amenable to mass production techniques.

One reason such devices are expensive to manufacture is that the optical fibers are usually surface mounted thereby requiring all surfaces of the optical fiber device to be ground, lapped and polished to a high degree of optical flatness, for example, to a point-to-point variation of about 20 Angstrom, as well as requiring various adjacent surfaces to be manufactured to the critical angle, all with very small tolerances allowed. Generally, liquid crystal optical devices proposed to date have utilized a pair of trapezoidal prisms having opposing bases with the liquid crystal material disposed therebetween. Hence, not only do the trapezoidal prisms require optical precision in the manufacturing thereof, but the alignment of the two prisms also becomes a precision assembly.

A further drawback of the proposed liquid crystal optical devices is that the crosstalk between the output ports thereof is excessive and the switching time is relatively slow due to the mass and volume of the liquid crystal material utilized. Typical of such proposed liquid crystal switching devices are those described and discussed in U.S. Pat. No. 4,201,442 issued to McMahon et al. on May 6, 1980, U.S. Pat. No. 4,278,327 issued to McMahon et al. on July 14, 1981 and U.S. Pat. No. 4,385,799 issued to Soref on May 31, 1983.

Many of the difficulties associated with the above-described devices have been overcome by devices and techniques such as those discussed and described in U.S. patent application Ser. Nos. 795,156, 795,151, 795,150 and 795,155 entitled LIQUID CRYSTAL OPTICAL SWITCHING DEVICE, LIQUID CRYSTAL OPTICAL SWITCHING DEVICE HAVING A MINIMIZED INTERNAL LIGHT PATH, LIQUID CRYSTAL CELL FOR USE IN AN OPTICAL SWITCH and LIQUID CRYSTAL OPTICAL SWITCHING DEVICE HAVING REDUCED CROSSTALK respectively, all filed on even date herewith and assigned to the assignee hereof. These applications are deemed incorporated herein by reference.

In consideration of the above, an optical interface apparatus particularly adapted to modulate and/or demodulate a light signal directly from/to a digital, or pulsed, signal is highly desirable to fully realize the advantages of optical fiber technology.

SUMMARY OF THE INVENTION

Accordingly, it is one object of the present invention to provide an optical interface apparatus for modulating and/or demodulating a light beam.

This object is accomplished, at least in part, by an apparatus including means, employing a liquid crystal material, for modulating a carrier light beam and means, also employing a liquid crystal material, for receiving a modulated light beam.

Other objects and advantages will become apparent to those skilled in the art from the following detailed description of the invention read in conjunction with the appended claims and the drawing attached hereto.

BRIEF DESCRIPTION OF THE DRAWING

The single FIGURE of the Drawing, not drawn to scale, is a block diagram of an optical interface apparatus embodying the principles of the present invention.

DETAILED DESCRIPTION OF THE INVENTION

Figure 1:
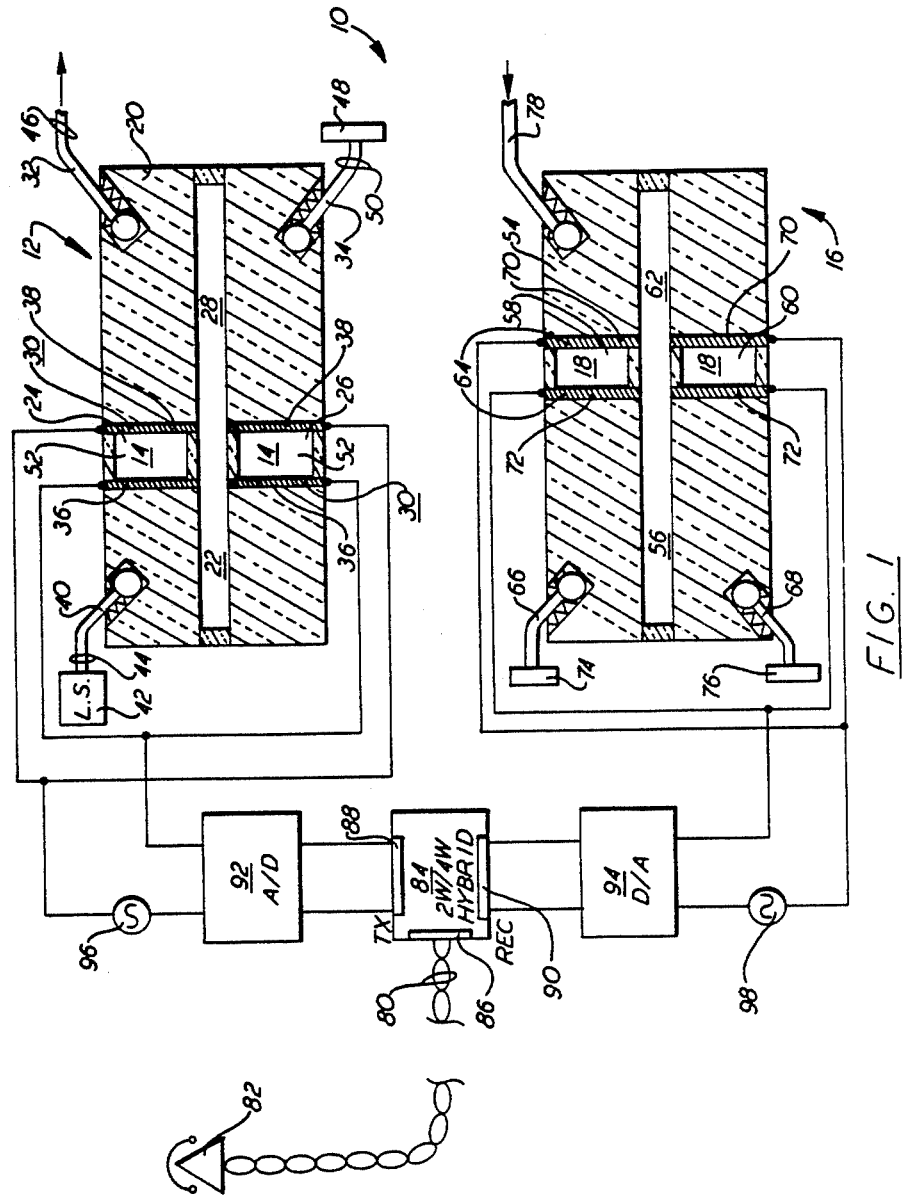

An optical interface apparatus, generally indicated at 10 in the drawing and embodying the principles of the present invention, includes means 12, employing a liquid crystal material 14, for modulating a carrier light beam in accordance with a time varying electrical signal and means 16, employing a liquid crystal material 18, for varying an electromagnetic field in accordance with a modulated light beam.

In one particular embodiment 12, the means for modulating a carrier light beam includes a liquid crystal optical switching device 20 similar to those discussed and described in U.S. patent application Ser. Nos. 795,157 and 795,154 entitled OPTICAL SWITCHING DEVICE and LIQUID CRYSTAL WAVE DIVISION DEVICE, respectively, both filed on even date herewith and assigned to the assignee hereof. These applications are incorporated herein by reference. In this particular embodiment, the liquid crystal optical switching device 20 includes means 22 for splitting an incident light beam, first and second twisted nematic liquid crystal cells, 24 and 26, respectively, disposed in the paths of the components of the split incident light beam and means 28 for recombining the components of the split incident light beam. The first and second twisted nematic liquid crystal cell, 24 and 26, respectively, include means 30 for directing the recombined light beam to either a first output port 32 or a second output port 34. The means 30 for directing the recombined components of the split incident light beam preferably includes, for each twisted nematic liquid crystal cell, 24 and 26, first and second electrodes, 36 and 38, respectively. As used in the apparatus 10 the modulation means 12 is adapted to receive a carrier light beam, via an input port 40 thereof, from a carrier light beam source 42. Preferably, the carrier light beam source 42 communicates with the input port 40 via an optical fiber 44. Further, the first output port 32 communicates with some means for accepting the modulated signal, not shown in the Figures, via an optical fiber 46 and the second output port 34 is terminated into a light absorber 48 via another optical fiber 50. The termination of the output port 34 into the light absorber 48 prevents deliterious reflections from the port 34 by maintaining a matched output for the light beam directed thereto Hence, in operation, the means 30 for directing the incident carrier light beam effectively operates to switch the carrier light beam either to the modulated light beam output port 32 or the light absorber 48. The particular output port, 32 or 34, selected is, as discussed in the above referenced patent application entitled OPTICAL SWITCHING DEVICE, dependent upon the electromagnetic field applied across the twisted nematic liquid crystal cells, 24 and 26. That is, when the electrodes, 36 and 38, have a first preselected voltage potential applied thereacross, the carrier light beam is directed to the modulated light beam output port 32. When an electromagnetic field is absent, i.e., the voltage applied to the electrodes, 36 and 38, is a second preselected voltage, usually less than the first preselected voltage, the carrier light beam is directed to the second output port 34 and extinguished by the light absorber 48 connected thereto. Consequently, the optical signal carried by the optical fiber 46 associated with the first output port 32 is modulated in accordance with the variation of the bilevel or time varying, signal applied to the electrodes, 36 and 38.

The means 16 for varying an electromagnetic field in accordance with a modulated light beam includes a second liquid crystal optical switching device 54 similar to the device 20 described above. As with the device 20 the switching device 54 includes means 56 for splitting an incident light beam, first and second twisted nematic liquid crystal cells, 58 and 60, respectively, disposed in the paths of the components of the split incident light beam and means 62 for recombining the components of the split incident light beam. The first and second twisted nematic liquid crystal cells, 58 and 60, respectively, include means 64 for directing the recombined light beam to either a first or a second output port, 66 and 68, respectively. The directing means 64 preferably includes, for each cell, 58 and 60, first and second spaced apart electrodes, 70 and 72, respectively. However, in the instance of the means 16, the twisted nematic liquid crystal material 18 is doped with a light responsive material. In one embodiment the light responsive material is a fluorescent material, such as, for example, pyrazoline. In one specific embodiment, the twisted nematic liquid crystal material 18 is doped with about 0.1% by molecular weight of pyrazoline. Further, both of the output ports, 66 and 68, of the switching device 54 are terminated in light absorbers, 74 and 76, respectively. In addition, the device 54 includes an input port 78 that receives a modulated light signal, for example, from an optical fiber communication system, not shown in the drawing.

In operation, the pyrazoline, essentially, creates "holes" within the twisted nematic liquid crystal material 18 when light impinges thereupon. The "holes" effectively short out the electromagnetic field across the liquid crystal material, that is, the liquid crystal material changes from a dielectric to a conductor. The shorting out collapses the electromagnetic field applied thereacross and thus causes an increase in the current flowing in the electrodes, 70 and 72, of the twisted nematic liquid crystal cells, 58 and 60.

In the collapsed field state, however, new holes are not created since the twisted nematic liquid crystal material 18 does not pass light. Consequently, the liquid crystal material 18 returns to the dielectric state thereby reestablishing the electromagnetic field thereacross. This process is repeated in synchronization with the modulation frequency of the incident light signal.

In one specific embodiment, the carrier light beam source 42 is an LED and the light absorbers, 48, 74 and 76, are light absorbing materials tuned to the wavelength of the LED.

Preferably, the optical interface apparatus 10, in one particular application, is adapted to interface with an analog subscriber line 80 connected, for example, to a subscriber subset 82 and used for telephonic communication. In such a specific application, the optical interface apparatus 10 includes a two-to-four wire hybrid 84 having an input/output port 86 connected to the subscriber line 80, a transmit port 86 and a receive port 90. The two-to-four wire hybrid 84 is well known in the telephony art, as such, a detailed description thereof is not deemed necessary herein. The transmit port 88 is, in this application, connected to an analog-to-digital converter 92 and the receive port 90 is connected to the digital to analog converter 94.

The output of the analog-to-digital converter 92 is connected across the first and second electrodes, 36 and 38, respectively, of the means 12 for modulating a carrier light beam. In one embodiment, an A.C. voltage source 96 is serially connected between the analog-to-digital converter 92. Thus, when the output of the analog-to-digital converter 92 is at a preselected voltage, the A.C. voltage source 96 establishes an electromagnetic field in the liquid crystal material 14. When the output of the analog-to-digital converter 92 charges, the electromagnetic field is removed. Thus, the carrier light beam is modulated in accordance with the analog signal on the subscriber line 80.

In a similar fashion, an electromagnetic field potential is applied to the first and second electrodes, 70 and 72, respectively, of the means 16, by, for example, another A.C. voltage source 98. Consequently, when a light pulse is received by the means 16 and the electromagnetic field collapses due to the creation of holes in the liquid crystal material 18, an operative current flows to the digital-to-analog converter 94. Considerably less current exists when the electromagnetic field is sustained in the liquid crystal material 18, i.e., when light is not impinging on the cells, 58 and 60.

In one particular implementation, the analog-to-digital converter 92 and the digital-to-analog converter 94 can be standard readily available elements and the A.C. voltage sources, 96 and 98, can be 5 volt, digitally controlled power supplies operating at between 2000 and 10,000 kilohertz.

Advantageously, in the preferred embodiment, the twisted nematic liquid crystal material, 14 and 18, in both the means 12 for modulating a carrier light beam and the means 16 for varying an electromagnetic field preferably includes minute, for example, approximately 0.1% molecular weight, quantities of a cholesteric liquid crystal material, such as CB-15 or C15 manufactured and marketed by E. Merck of Rahway, N.J. Such a doping enhances the ordering of the molecules of the liquid crystal material, 14 and 18, and thus allows switching speeds of the twisted nematic liquid crystal cells 24, 26, 58 and 60 to be about a microsecond.

Although the present invention has been described with respect to one particular embodiment, it will be understood that other arrangements and configurations can also be used. Hence, the present invention is deemed limited only by the appended claims and the reasonable interpretation thereof.

What is claimed is:

1. An optical interface apparatus comprises:
   means, employing a first liquid crystal material, for modulating a carrier light beam in accordance with a time varying electrical signal;
   means, employing a second liquid crystal material, for modulating an electromagnetic field in accordance with a modulated light beam; and
   means for providing a time varying signal to said carrier light beam modulating means, said time varying signal providing means including an analog-to-digital converter whereby said carrier light beam is modulated in accordance with the digital output of said analog-to-digital converter.

2. Apparatus as claimed in claim 1 further comprises:
   a light source for providing said carrier light beam.

3. Apparatus as claimed in claim 2 further comprises:
   means for conveying said carrier light beam from said light source to said carrier light beam modulating means.

4. Apparatus as claimed in claim 3 wherein said carrier light beam conveying means includes an optical fiber.

5. Apparatus as claimed in claim 1 wherein said carrier light beam modulating means includes:
   a first liquid crystal optical switching device, said device having an input port, first and second output ports and means for directing a carrier light beam inputted via said input port to either of said first or second output ports, said light beam directing means including means for sustaining an electromagnetic field in said first liquid crystal material, said electromagnetic field being responsive to said time varying electrical signal.

6. Apparatus as claimed in claim 5 wherein said means for sustaining an electromagnetic field incudes first and second spaced apart electrodes.

7. Apparatus as claimed in claim 6 further comprising:
   a source of digital signals, said digital signals being connected to said first and second electrodes, said connection to first electrode being in series with a switched source of A.C. voltage.

8. Apparatus as claimed in claim 7 wherein said first liquid crystal material is a nematic liquid crystal including:
   a minute quantity of cholesteric liquid crystal material.

9. Apparatus as claimed in claim 5 further comprising:
   a second liquid crystal switching device, said second device having an input port, means, disposed in the path of a light beam entering said input port, for sustaining said electromagnetic field across said second liquid crystal material and means, responsive to light, for varying the dielectric constant of said liquid crystal material.

10. Apparatus as claimed in claim 9 wherein said means for sustaining said electromagnetic field includes first and second electrodes and a source A.C. voltage in series with one of said electrodes.

11. Apparatus as claimed in claim 9 wherein said light responsive means includes:
    a fluorescent material, said fluorescent material being dispersed in said second liquid crystal material.

12. An optical interface apparatus comprises:
    means, employing a first liquid crystal material for modulating a carrier light beam in accordance with a time varying electrical signal;
    means, employing a second liquid crystal material, for modulating an electromagnetic field in accordance with a modulated light beam;
    means for providing a time varying signal to said carrier light beam modulating means; and
    means for converting said time varying signal to an analog signal.

13. Apparatus as claimed in claim 12 wherein said modulated electrical signal converting means is a digital-to-analog converter.

14. Apparatus a claimed in claim 13 wherein said time varying signal providing means includes an analog-to-digital converter whereby said carrier light beam is modulated in accordance with the digital output of said analog-to-digital converter.

15. Apparatus as claimed in claim 14 further comprises:
    means for interfacing said analog-to-digital converter and said digital-to-analog converter to an analog communication medium.

16. Apparatus as claimed in claim 15 wherein said analog-to-digital converter and digital-to-analog converter interfacing means includes a two-to-four wire hybrid.

17. Apparatus as claimed in claim 16 wherein said communication medium includes a pair of wires adapted for telephonic communication.

* * * * *